March 31, 1931. J. S. KEEN 1,799,048
LOCOMOTIVE CAB
Filed July 31, 1930 2 Sheets-Sheet 1
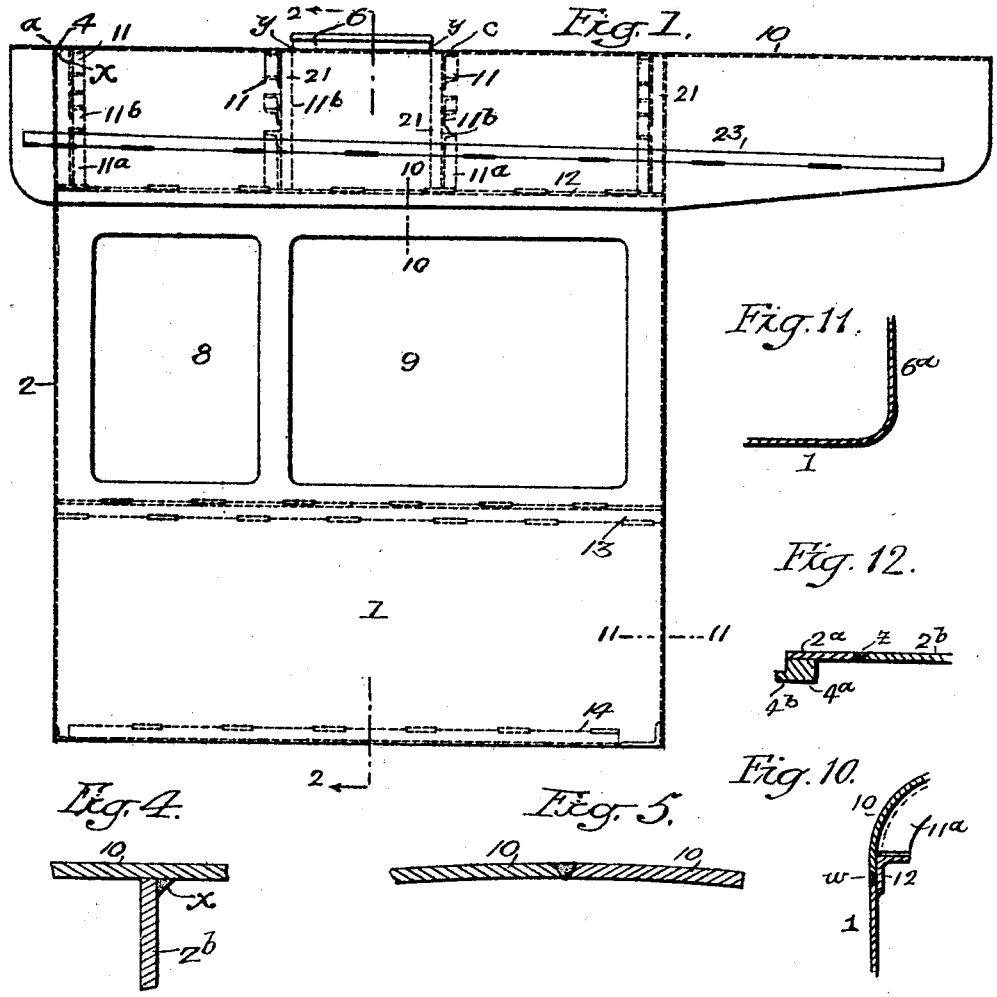

March 31, 1931.  J. S. KEEN  1,799,048
LOCOMOTIVE CAB
Filed July 31, 1930   2 Sheets-Sheet 2
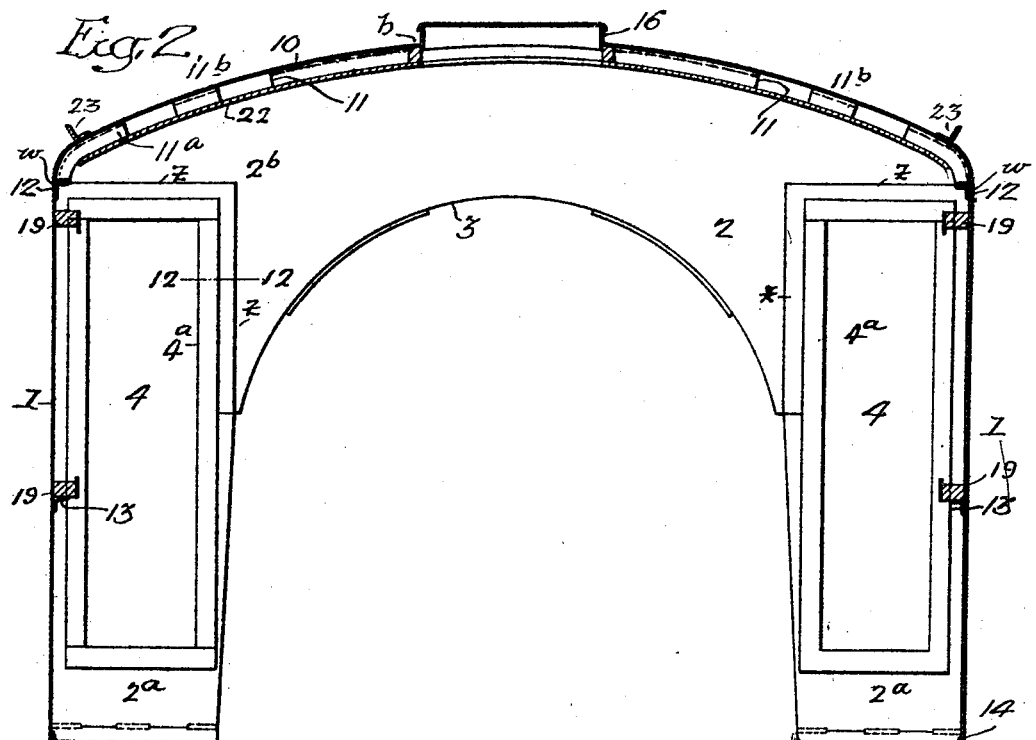
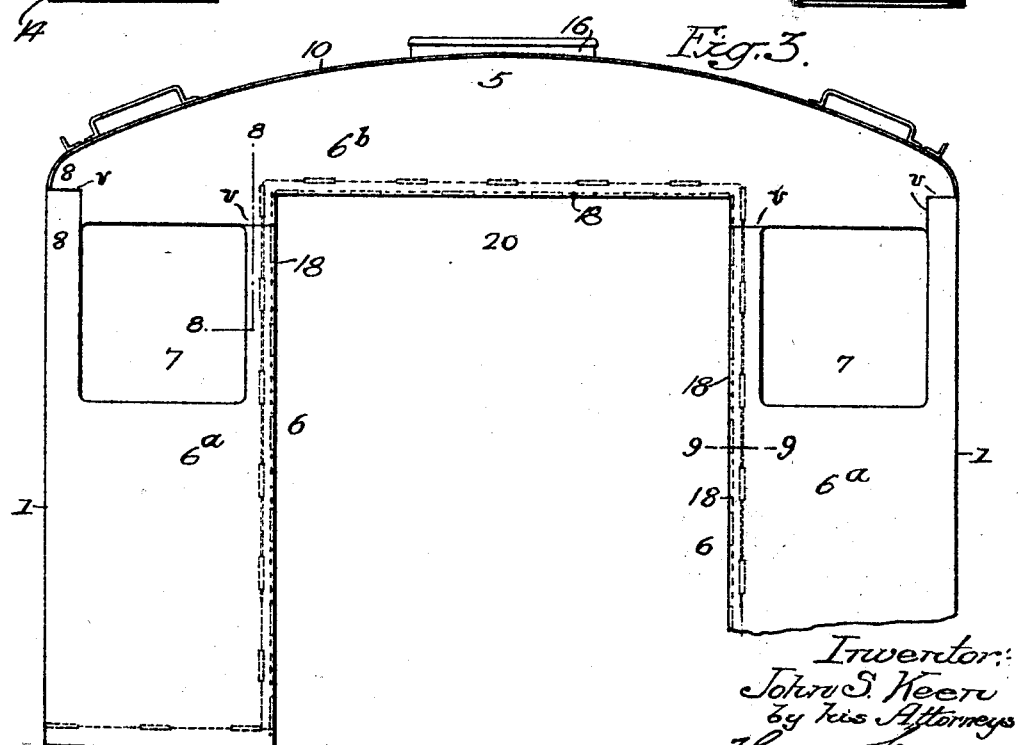

Patented Mar. 31, 1931

1,799,048

UNITED STATES PATENT OFFICE

JOHN S. KEEN, OF PHILADELPHIA, PENNSYLVANIA

LOCOMOTIVE CAB

Application filed July 31, 1930. Serial No. 472,080.

One object of my invention is to make a locomotive cab of sheet steel or iron, in which the sheets are welded together and in which the number of angle shapes are materially reduced.

A further object of the invention is to make each side and portions of the ends of the cab from a single sheet of metal, cut out to form window and door openings and bent as described hereafter.

A still further object of the invention is to provide a comparatively smooth surface on the exterior of the cab.

In the accompanying drawings:

Fig. 1 is a side view of a cab illustrating my invention;

Fig. 2 is a sectional view on the line 2—2, Fig. 1, looking towards the front end of the cab;

Fig. 3 is a rear end view of the cab;

Fig. 4 is a sectional view showing the joint between a roof plate and the forward end plate as indicated at $a$, Fig. 1;

Fig. 5 illustrates the weld uniting two roof plates;

Fig. 6 is a view showing the method of welding the ventilated structure to the roof as indicated at $b$, Fig. 2;

Fig. 7 shows a method of welding short angle beams to the roof as at $c$, Fig. 1;

Fig. 8 is a sectional view on the line 8—8, Fig. 3, showing the weld uniting the two plates at the rear end of the cab;

Fig. 9 is a sectional view on the line 9—9, Fig. 3;

Fig. 10 is a sectional view on the line 10—10, Fig. 1, showing a method of welding the roof plates to the side plates;

Fig. 11 is a sectional view on the line 11—11, Fig. 3, and

Fig. 12 is a section on the line 12—12, Fig. 2, showing the wooden door frame secured to the forward end plates.

The cab which I will now proceed to describe is made of sheet metal plates bent into shape and welded. Very few angle beams are used and those which are used act as frame beams for the sides and ends of the cab, and those at the roof provide means for fastening wooden roof members to the metal roof, as it will be understood that the roof is preferably provided with a wood lining. The body portion of the cab may also be lined with wood or other material if desired.

1—1 are the sides of the cab. 2 is the front end of the cab and 6 is the rear end of the cab. The plates forming the sides of the cab are bent at each end as shown in Fig. 11 and form the part $2a$ of the front end of the cab and the part $6a$ at the rear end of the cab. The parts $2a$ at the forward end of the cab are butt welded as indicated at $z$—$z$ to an overhead plate $2b$ at the forward end, forming the upper portion of the forward end of the cab. This plate is cut on a curved line as at 3 to fit the boiler of the locomotives.

Each of the sections $2a$ are cut out to provide doorways 4, and the jambs $4a$ of these doorways are preferably made of wood, as shown in Fig. 12, to which the doors are hung. In usual practice the doors swing outwards so that the door, when closed, will rest against the flanges $4b$ of the wooden jambs. If the door is hung to swing inwardly, then the wooden jambs are made rectangular in cross-section and are set back so that the edge of the metal plate will project beyond the jambs.

8 and 9 are window openings in the sides of the cab. These openings are provided with sash, one or both of which may be of the sliding type and slide upon the rails 19, the lower rail being supported by an angle bar 13 which acts also as a stiffening member for the sides of the cab. 14 is a base angle beam which extends on each side and on each end of the cab and is welded to the sides and ends of the cab as shown.

12 is an angle bar which forms the plate of the cab and the joint between the sides of the cab and the roof plates 10 is, in this instance, back of the angle bar as indicated at $w$, Fig. 10. The two rear end members $6a$ which form an integral part of the side members of the cab are connected by an overhead plate $6b$, being welded as indicated to the plate at $v$—$v$.

The window openings 7 in the rear of the cab are formed by cutting away the end portions $6a$ and the upper connecting plate $6b$ forms the top of the window frame in the present instance. The rear end is reinforced at the opening 20 by angle bars 18 which are welded to the plates 6a and 6b in the manner shown in Fig. 9. The plates 6a and 6b extend beyond the angle bars so as to allow the bars to be welded to the plates at the two points indicated in Fig. 9.

In the structure shown no floor plate is used as the running-board of the locomotive extends under the cab and the flanges of the angle beams 14 are secured to the running-board, but where a metal plate is used as the floor, then the plate is preferably welded to these angle beams 14.

The several beams are preferably welded to the plates at intervals as shown in Figs. 1 and 3, as a continuous weld is not necessary. The joint between the roof plate 10 and the front end plate 2b is indicated at $x$ in Fig. 4, and the roof plate is welded to the plate 6b at the rear end of the cab in like manner.

The roof is preferably made up of a number of plates, and these plates are butt welded as shown in Fig. 5.

The ventilator structure 16 is of any approved type and is attached to the roof plates 10 by a weld $y$ as shown in Fig. 6. Extending transversely under the roof plates 10 and welded thereto are sectional angle beams 11a and 11b. The end beams 11b are welded to the plate beams 12 as well as to the roof plates. These beams 11—11a—11b form the means by which the wooden strips 21 are secured in position and to which the ceiling boards 22 are attached.

Where a ceiling lining is not desired, then the lining and the strips may be dispensed with. 23 are angle bars which are located one on each side of the roof and are set at any angle. These bars form gutters to direct rain water to the rear of the cab.

By the above construction, a cab made in accordance with my invention will have no angle bars or T-irons which project into the interior of the cab, with the exception of those necessary to form with plates the frame of the cab. This construction materially reduces the weight of the cab, and by making the sides and portions of the ends of the cab from a single plate, corner angles and other stiffening members are dispensed with.

I claim:—

1. A cab for a locomotive made of sheet metal, in which the sides and a portion of each end of the cab are made from single sheets of metal bent into shape.

2. A cab for a locomotive made of sheet metal and consisting of side members and front and rear end members and roof plates, portions of the front and rear plate ends of the cab being formed integral with the sides of the cab, and the overhead plates of the front and rear of the cab being butt welded to the portions of the front and rear end plates which are formed integral with the sides.

3. A cab for a locomotive made of sheet metal, the sides of the cab being made of single sheets, and the roof being made of a number of sheets secured together by butt welding.

4. A cab for a locomotive made of sheet metal having sheet metal sides and a roof structure, the edges of the roof structure being butt welded to the sides, and a longitudinal angle beam forming the plate of the cab, the weld being directly back of the angle beam.

5. The combination in a locomotive cab, of sheet metal sides and a sheet metal roof secured thereto; angle beams welded to the roof at intervals; and wooden strips secured to said beams and to which the lining of the cab is secured.

6. The combination in a cab for a locomotive having one-piece side members which are bent at each end to form portions of the front and rear ends of the cab, of roof plates; and a ventilator structure of metal extending through an opening in the roof and welded to the roof plate.

7. A cab for a locomotive in which the sides and portions of each end are made of sheet metal bent into shape, each end section being cut away to form window and door openings; front and rear plates welded to the end members which form an integral part of the side plates of the cab; and a sheet metal roof structure welded to the upper end plates.

8. A cab for a locomotive made of sheet metal, and in which each side and a portion of an end are made from a sheet of metal bent into shape.

JOHN S. KEEN.